Oct. 22, 1968 D. C. REILLY 3,406,438
PLASTIC-METAL BELT CONVEYOR ROLLER ASSEMBLY
Filed Sept. 19, 1966
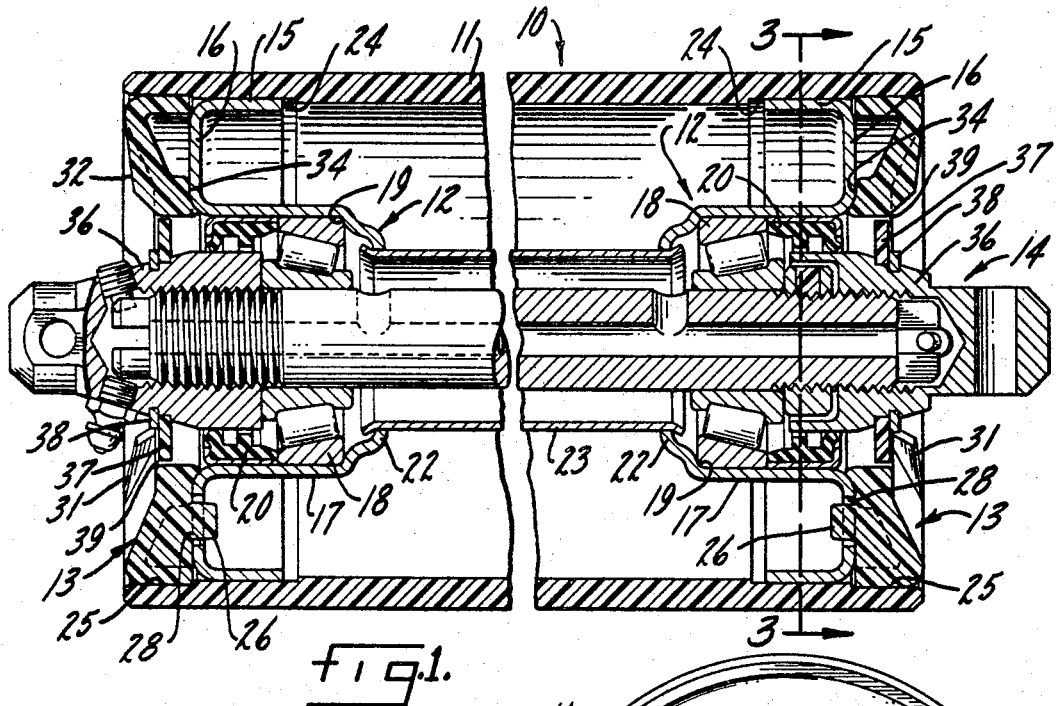
fig.1.
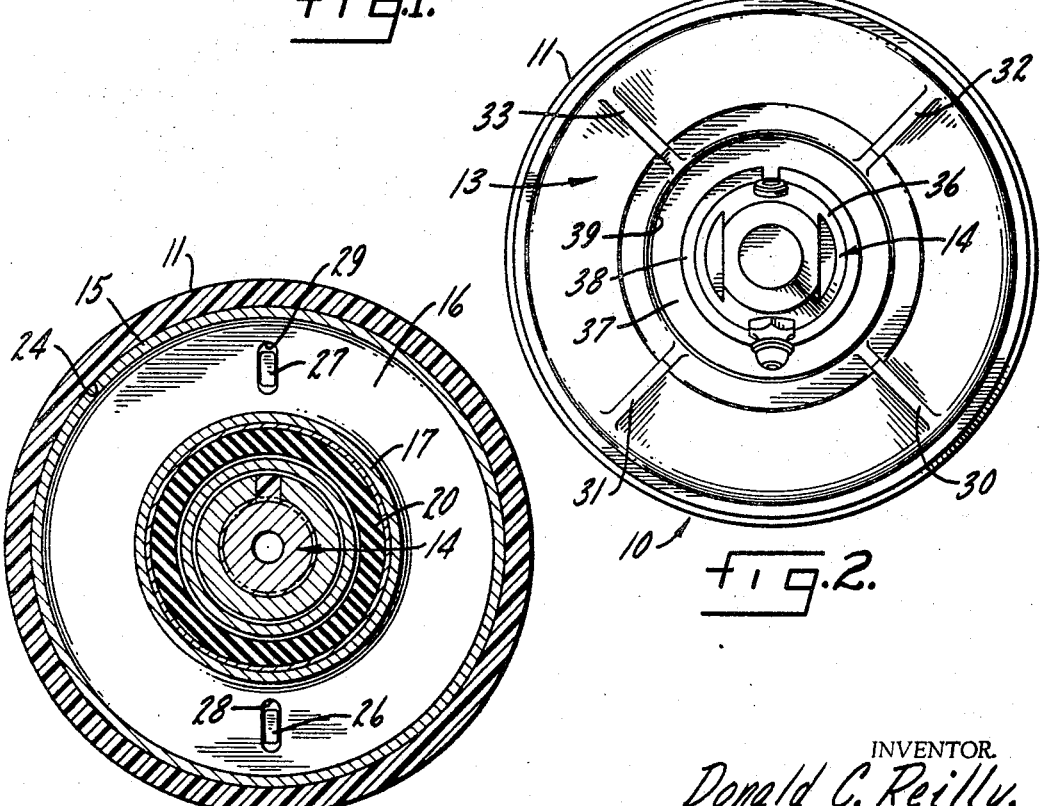
fig.2.
fig.3.
INVENTOR.
Donald C. Reilly,
BY Parker & Carter
Attorneys.

United States Patent Office 3,406,438
Patented Oct. 22, 1968

3,406,438
PLASTIC-METAL BELT CONVEYOR
ROLLER ASSEMBLY
Donald C. Reilly, Downers Grove, Ill., assignor to Westinghouse Air Brake Company, Pittsburgh, Pa., a corporation of Pennsylvania
Filed Sept. 19, 1966, Ser. No. 580,288
10 Claims. (Cl. 29—116)

ABSTRACT OF THE DISCLOSURE

A belt conveyor roller having a plastic shell, a steel shaft, bearing assembly and bearing retainer, and a plastic locking member fixed to the plastic shell which locks the bearing retainer to the plastic shell to prevent loosening of the bearing retainer, and relative rotation between it and the shell, due to the differing thermal expansion rates of plastic and steel.

---

This invention relates generally to rollers and particularly to a belt conveyor roller of the type having plastic and metal components which is subjected to temperature variations in operation.

Rollers of the type illustrated in Patents 2,773,257 and 3,239,285 and made partially of plastic materials are very desirable for certain applications such as corrosive environments of the kind found in certain mines. Because of the rugged operating conditions to which such rollers are exposed it is usually preferable to form the threaded shaft assemblies of steel, and confine the use of the plastic materials to the roller shell and associated parts which do not carry concentrated loads. Because the metal and plastic materials have different coefficients of expansion and contraction certain problems arise, particularly the problem of maintaining a tight fit between abutting metal and plastic components when temperature changes occur.

Accordingly a primary object of this invention is to provide a tight fitting roller especially adapted for use in belt conveyor idler assemblies in which the shell and end portions are composed of a non-corrodable, plastic material and the interior is composed of a metal, such as steel.

Another object is to provide a roller as above described in which a tight connection is maintained between abutting metal and plastic components.

Another object is to provide a rugged and commercially economical roller made from plastic and metal materials, the operation of which will not be affected by temperature variations which cause differing expansions of the plastic and metal components which comprise it.

Another object is to provide a unique roller construction having a roller shell made of plastic and a supporting shaft assembly made of metal in which the plastic shell is supported in a precise, fixed position with respect to the supporting shaft assembly at all times, and under different environmental temperature conditions.

Yet a further object is to provide a roller construction having a plastic roller shell and a metal bearing retainer supporting the shaft assembly in which drift or relative longitudinal movement between the bearing retainer and the shell resulting from differing rates of contraction and expansion between the interfitting plastic and metal components is prevented.

Another object is to provide a roller construction having a unique plastic-metal interlock between the plastic roller shell and the metallic end plates.

Other objects and advantages will become apparent from a reading of the following description of the invention.

The invention is illustrated more or less diagrammatically in the accompanying figures, wherein:

FIGURE 1 is a sectional view with parts omitted of a roller embodying the present invention, the top half of the view being rotated 45° out of position for clarity of illustration;

FIGURE 2 is an end view of the roller as viewed from the left of FIGURE 1; and

FIGURE 3 is a sectional view taken substantially along the line 3—3 of FIGURE 1.

Like reference numerals will be used to refer to like parts throughout the following descriptions of the figures.

Since the structure of the roller assembly is identical at each end insofar as the present invention is disclosed, a description of the components at only one end will be set forth.

The roller assembly is indicated generally at 10 in FIGURE 1. The roller assembly consists of a roller shell 11, a bearing retainer assembly 12 and head member or end wall 13, all of which rotate about a dead shaft assembly 14. Shaft assembly 14 may be of any suitable construction. A typical, and quite usable construction, is illustrated and described in Patent 3,239,285, assigned to the assignee of this application to which reference is herein made for further explanation.

The bearing retainer assembly 12 includes an annular peripheral flange portion 15, an end wall portion 16, and a barrel portion 17. The outer race 18 of a bearing assembly is received in a seat 19, and a wiper seal assembly is indicated at 20. The innermost end of the barrel portion 17 terminates in a lip 22 which peripherally contacts a tube 23, the tube forming, in conjunction with the bearing retainer and other members at each end of the shaft assembly, a lubricant reservoir, all as fully described in Patent 3,239,285.

Roller shell 11 is composed of a plastic material such as polyvinyl chloride or any other suitable plastic having the desired structural characteristics. A plastic shell is employed because of the exposure of the roller to an environment which has a corrosive effect on metal. The bearing retainer member 12 is composed of metal for reasons of strength and stress withstanding ability.

The outer peripheral flange 15 is precisely machined to be received within a bore 24 formed in the end portion of the roller shell 11. A tight fit is formed between the roller and the flange 15, which fit can even be a drive fit. If desired, an oversized fit may be employed. There may be times, however, when temperature conditions are such that the frictional fit between the bore 24 and the flange 15 are such that a loosening will occur and the flange may turn relative to the roller shell 12. Under severe conditions the bearing retainer 12 might even drift outwardly.

In this specification and in the following claims the terms inwardly and outwardly are used in reference to directions looking toward and away from the center of the assembly using either end as a reference point.

It is to prevent loosening of the frictional fit between the metallic bearing retainer 12 and the plastic roller shell 11 with which this invention is primarily concerned, and to this end an annular head 13 is provided. Head 13 is preferably of the same kind of plastic material as shell 11 so that these two components will expand and contract at the same rate due to temperature variations. If desired, the head may be adhesively secured to the interior of the shell as at 25. By using a type of adhesive which actually dissolves the surface of the plastic materials an effective one piece plastic connection can be formed between parts 13 and 11. Any one of a number of conventional and readily available adhesive materials may be used for this purpose, such as a polyvinyl chloride cement. Alternately, and preferably, the head 13 may be anchored in the illustrated position by a force fit. An oversize fit of several thousandths of an inch will provide an excellent securement.

Head 13 is provided with at least one longitudinally inwardly extending key projection 26. In this instance two have been indicated, one at 26 and the other at 27. These projections extend into corresponding holes 28, 29 formed in the end wall portion 16 of the bearing retainer.

A plurality of ribs 30–33 are provided at spaced intervals about the exterior of the head member 13 to provide additional rigidity.

An inner annular seat is formed as at 34 on the plastic head member 13. The seat is contoured so as to receive the shoulder formed between barrel portion 17 and end wall portion 16 in abutting relationship.

The bearing cap 36 has been recessed to receive an annular plastic seal ring 37 which is held in place by a snap ring 38. The result is a very narrow circular opening 39 so that ingress of dirt and foreign matter to the bearing structure is minimized.

The use and operation of the invention are as follows:

Loosening of the tight fit between the metallic bearing retainer member 12 and plastic shell 11 with consequent relative rotation between these two members is prevented by the end wall or head member indicated generally at 13.

The bearing retainer member 12 is snugly received in bore 24 in roller shell 11. Thereafter the head member 13 is forced into a slightly larger bore area. Either a mechanical interlock may be employed to fasten the head member 13 to the roller shell 11, as by an oversize fit, or one of the conventional adhesives which actually causes the plastic materials to melt and weld together may be employed. In either event the head member 13 is driven inwardly until the seat 34 engages the complementary shoulder on the bearing retainer.

The head members 13 are so aligned with the bearing retainer that the keys or projecting members 26, 27 are received within apertures 28, 29 formed in the bearing retainer. It will be understood that the form of bearing retainer member 12 here illustrated is exemplary only. For example a spoke line configuration might be employed if desired. The important point is that a pair of radially aligned components, one associated with each of the head members 13 and bearing retainer 12 are aligned in abutting, or nearly abutting, relationship with one another. Thus, for example, it might be feasible to form the keys or projections on the end wall portion 16 of the bearing retainer member, and form the apertures in head member 13. Likewise the above referred to spoke arrangement might be utilized with the projections 26 and 27 carried by the head member 13 being disposed between adjacent spokes in the bearing retainer member 12.

It is also contemplated that the bearing retainer member 12 and the head member 13 may be assembled as a unit, and the assembled unit then placed into the bores 24 and 25. In this event the key projections 26, 27 might be modified, as by forming depressable lobes thereon, so that the head member 13 can be snap fitted to the retainer 12. Any suitable snap fitting or locking means may be employed. This modification may eliminate one additional assembly operation, particularly if the head member 13 is snapped into the bearing retainer 12 at the same instant the bearing retainer is being forced into bore 24.

If desired, the portion of the shaft assembly which protrudes outwardly beyond the head member 13 may be coated with plastic or a conventional metal coating such as cadmium. Since the shaft nut is a relatively solid piece, coating may be omitted under some circumstances, as where the useful life of the roller is expected to be shorter than the life of the corrodable, relatively solid shaft assembly.

The angular shield 37 functions, in conjunction with that portion of the shaft assembly which carries it, to narrow the area of ingress to the interior of the assembly to a very narrow width whereby opportunity for the admission of contaminates and foreign material is reduced.

The end result is that the outer plastic shell 11 is precisely supported with respect to the centerline of the shaft assembly under all temperature conditions. The shell is maintained concentric with the centerline of the shaft assembly while rotation and/or displacement of the shell 11 relative to the bearing retainer 12 is prevented.

Although a preferred embodiment of the invention has been illustrated and described it will at once be apparent to those skilled in the art that various modifications may be made within the spirit and scope of the invention. Accordingly, it is intended that the scope of the invention be limited not by the scope of the foregoing description but solely by the scope of the hereinafter appended claims.

I claim:

1. In a roller assembly the combination of a roller shell,
 a supporting shaft assembly which includes bearing means for enabling relative rotational movement to occur between the roller shell and the supporting shaft assembly,
 a bearing means retainer interposed between the roller shell and one end of the supporting shaft assembly which centrally positions the supporting shaft assembly with respect to the roller shell,
 said roller shell and said bearing means retainer having dissimilar coefficients of thermal expansion, and
 means for maintaining the bearing means retainer non-rotatably fixed to the roller shell under varying temperature conditions.

2. The roller assembly of claim 1 further characterized in that the roller shell is composed of plastic, and the bearing means retainer is composed of metal.

3. The roller assembly of claim 2 further characterized in that
 the means for maintaining the metal bearing means retainer fixed to the plastic roller shell includes
 a plastic locking member fixed to and rotatable with the plastic roller shell, and
 interlock means associated with the plastic locking member and the bearing means retainer which prevents relative rotation therebetween,
 said plastic locking member being so positioned as to restrain longitudinal movement of the bearing means retainer with respect to the roller shell.

4. The roller assembly of claim 3 further characterized in that the plastic locking member is bonded to the roller shell.

5. The roller assembly of claim 3 further characterized in that the plastic locking member is located outwardly of the bearing means retainer.

6. The roller assembly of claim 3 further characterized in that the interlock means associated with the plastic locking member and the bearing means retainer includes a projection formed on one of said components which is radially aligned with an abutment surface on the other of said components.

7. The roller assembly of claim 6 further characterized firstly, in that the projection is formed on the plastic locking member,
 secondly, in that the plastic locking member is located outwardly of the bearing means retainer, and
 thirdly, in that the plastic locking member has an annular configuration,
 said supporting shaft assembly projecting through and extending outwardly beyond the plastic locking member,
 the inner annular edge portion of the plastic locking member being spaced only a short distance from a shield member which is carried by and projects outwardly from the supporting shaft assembly,
 the outer peripheral edge of the shield member conforming closely to the inner edge of the plastic locking member to thereby provide minimum opportunity for ingress of foreign material to the bearing means.

8. The roller assembly of claim 7 further characterized in that the plastic locking member carries seating means which conform to a complementary surface area on the bearing means retainer and which prevent outward displacement of the bearing means retainer.

9. A roller assembly which includes, in combination, a plastic roller shell,
a supporting shaft assembly for the shell which includes a bearing assembly at each end for enabling relative rotational movement to occur between the roller shell and the supporting shaft assembly,
a bearing assembly retainer for each bearing assembly,
each retainer being composed of a metal which has a coefficient of thermal expansion different from the coefficient of thermal expansion of the plastic shell, each retainer further having a seat which receives its associated bearing and a peripheral flange which is force fitting against the internal periphery of the plastic roller shell under room temperature conditions,
an annular, plastic locking ring for each bearing assembly retainer integrally joined to the internal periphery of the plastic roller shell,
said locking ring having substantially the same coefficient of thermal expansion as the plastic roller shell, each of said plastic locking rings being located outwardly from its associated bearing assembly retainer and having a seating surface against which its associated bearing assembly retainer is adapted to abut, whereby longitudinal outward movement of the bearing assembly retainer with respect to the roller shell is prevented,
each of said annular plastic locking rings and the supporting shaft assembly which projects centrally through it forming a substantially continuous surface to thereby minimize the opportunity for ingress of foreign material to the adjacent bearing assembly, and
mechanical interlock means carried by each of said plastic locking rings and its associated bearing assembly retainer,
each of said mechanical interlock means including a projection formed on one of said components which is radially aligned with an abutment surface on the other of said components whereby relative rotational movement between the bearing assembly retainer and the roller shell is prevented.

10. The roller assembly of claim 9 further characterized in that
a plurality of apertures are formed in each retainer, and
a plurality of projections are formed on each of the plastic locking rings,
each projection extending longitudinally of the roller assembly a distance sufficient to be radially aligned with an adjacent abutting surface formed in an associated aperture.

References Cited

UNITED STATES PATENTS

| 2,885,247 | 5/1959 | Schlums | 29—116 XR |
| 3,239,285 | 3/1966 | Madeira et al. | 308—20 |

FOREIGN PATENTS

| 1,370,774 | 7/1963 | France. |
| 808,177 | 1/1959 | Great Britain. |

BILLY J. WILHITE, *Primary Examiner.*